United States Patent [19]

Bunick et al.

[11] Patent Number: 4,948,596

[45] Date of Patent: Aug. 14, 1990

[54] METHOD OF PURIFYING POLYDEXTROSE AND COMPOSITION CONTAINING SAME

[75] Inventors: Frank J. Bunick, Budd Lake; Shiuh J. Luo, Morris Plains, both of N.J.

[73] Assignee: Warner-Lambert Company, Morris Plains, N.J.

[21] Appl. No.: 276,500

[22] Filed: Nov. 22, 1988

Related U.S. Application Data

[63] Continuation-in-part of Ser. No. 43,793, Apr. 29, 1987.

[51] Int. Cl.$^5$ .............................................. A23L 1/015
[52] U.S. Cl. ......................................... 426/3; 426/258; 426/454; 426/539; 426/658; 426/660; 426/548; 426/804
[58] Field of Search ............... 426/658, 804, 548, 539, 426/442, 258, 3, 454, 660

[56] References Cited

U.S. PATENT DOCUMENTS

| | | |
|---|---|---|
| 2,876,104 | 3/1959 | Bliudzius et al. . |
| 2,876,105 | 3/1959 | Jucaitis et al. . |
| 2,876,106 | 3/1959 | Jucaitis et al. . |
| 2,876,107 | 3/1959 | Jucaitis et al. . |
| 3,766,165 | 10/1973 | Rennhard . |
| 3,876,794 | 4/1975 | Rennhard ............................ 426/152 |
| 4,528,206 | 7/1985 | Kastin ................................. 426/660 |
| 4,622,233 | 11/1986 | Torves ................................ 426/548 |

FOREIGN PATENT DOCUMENTS

61-254148A 11/1986 Japan .

OTHER PUBLICATIONS

R. E. Smiles, The Functional Applications of Polydextrose, pp. 305–322, in *Chemistry of Foods and Beverages: Recent Developments*, Academic Press, Inc., 1982.

Primary Examiner—Jeanette Hunter
Attorney, Agent, or Firm—Charles A. Gaglia; Daniel A. Scola, Jr.

[57] ABSTRACT

A process for purifying polydextrose to remove contaminants remaining from manufacturing sufficient to provide an organoleptically-acceptable polydextrose ingredient for foodstuffs which includes intimately contacting an aqueous solution of polydextrose having a concentration of from about 10% to about 50% with a polar organic solvent in a ratio of polydextgrose solvent of from about 5–15 of polydextrose to about 45–75 by weight of solvent. Furthermore, the mixture is allowed to equilibrate to form a substantially contaminant-containing fraction and a substantially polydextrose-containing fraction, followed by separating the fractions for use of the polydextrose-containing fraction. The present invention further includes compositions of foodstuffs including the purified polydextrose.

32 Claims, 4 Drawing Sheets

METHOD OF PURIFYING POLYDEXTROSE AND COMPOSITION CONTAINING SAME

This is a continuation-in-part of copending application Ser. No. 043793 filed on Apr. 29, 1987.

BACKGROUND OF THE INVENTION

The present invention relates to the art of providing low-calorie bulking agents for food products, and, in particular, provides a reduced-calorie bulking agent which is oranoleptically acceptable for use in even sweetened compositions, such as confections.

In recent years, it has become increasingly important to persons in nearly all countries of the world to give heed to the caloric intake attendant food consumption. This tendency has been occasioned by increased attention to health and grooming considerations The beverage industry has met demands resulting from popular trends by providing diet soft drinks which rely on high intensity sweeteners to replace the sugar content. However, solid food manufacturers have not been as successful since sugar provides bulk, as well as sweetness, which must be replaced with a reduced-caloric bulking agent when the sugar is removed.

To this end, an exceptionally low-calorie bulking agent has been developed which is referred to as polydextrose. Polydextrose provides a substitute for sugar and has many of the desired technological properties of sugar, but does not have the sweetness. This non-sweet bulking capability can be an advantage in those food products where the conventional sugar-based compositions are too sweet for some tastes. Thus in those foods where it is desired to control both calories and sweetness, polydextrose in combination with an artificial sweetener can preferably be used. The calories can often be reduced by 50% or more.

Polydextrose is a non-nutritive carbohydrate substitute which can be prepared through polymerization of glucose in the presence of food-acceptable polycarboxylic acid catalysts and polyols. See U.S. Pat. No. 3,766,165 and U.S. Pat. No. 3,876,794. Generally, polydextrose is known to be available in two forms, Polydextrose A, a solid, and polydextrose N, a 70% solution, both of which also include low molecular weight components, such as glucose, sorbitol and oligomers.

Unfortunately, the ability to use polydextrose is hampered by its unacceptable bitterness and "musty" off-flavor when used in a sufficient amount, which can be attributed to small molecular weight compounds, e.g., less than 1000 a.m.u. remaining after manufacturing Bitterness may be associated with endogenous levoglucosan (1,6-anhydroglucose), which small amounts of furfural derivatives may be responsible for the "musty" off-flavors.

U.S. Pat. No. 4,622,233 to Torres discloses a first method of treating polydextrose, Type A, by decolorizing with a bleaching agent and thereafter purifying. A further method is disclosed and claimed in the Torres '233 disclosure for reducing color, glucose content and anhydroglucose content of Type A polydextrose which includes (a) contacting a 60-70% (W/W) aqueous solution of polydextrose Type A with a food approved bleaching agent at a temperature of 25°-90° C., and a pH of about 2.5 to about 9.0; (b) adjusting the pH of the product of step (a), if above 7, to about 6; (c) adding one or more of the solvents selected from the group consisting of methanol, ethanol and ethylacetate such that said solvent includes 50-80% (W/W) of the mixture; and (d) filtering the final product, and, if desired, drying Unfortunately, however, the Torres '233 patent ties decoloration to purification, which is not necessary, and which can be an undesired process requirement and condition. For example, when the polydextrose is subjected to high heating, such as in cooking, the coloring returns to the substance. In many cases, there is no need for decoloration whatsoever. Furthermore, extra steps are required by Torres which require additional time, handling, and energy;

It has now been found, however, that polydextrose can be purified in essentially one step to remove the organoleptically displeasing characteristic and provide a purified product which is particularly useful in, among other things, confectionary products such as hard candy.

SUMMARY OF THE INVENTION

The present invention is a process for purifying polydextrose, and the purified product resulting therefrom to remove contaminants remaining from manufacturing sufficiently to provide an organoleptically-acceptable polydextrose ingredient. The process of the present invention includes intimately contacting an aqueous solution of polydextrose in a concentration of from about 10% to about 90% with a polar organic solvent in a ratio of polydextrose to solvent of from about 5 to 45 by weight of polydextrose to about 35 to 85 by weight of solvent, the concentration of the aqueous polydextrose is most preferably about 10% to about 50% with a polar organic solvent in a ratio of polydextrose to solvent to from about 5-15 by weight of polydextrose to about 45-75 by weight of solvent. The mixture is then allowed to equilibrate to form a substantially contaminant-containing fraction and a substantially polydextrose-containing fraction, followed by separating the fractions for use of the polydextrose-containing fraction.

Both the top layer of the substantially contaminant-containing fraction and the bottom layer containing the substantially polydextrose-containing fraction are liquid fractions. The polydextrose containing fraction being substantially free of precipitate The two liquid fractions form a liquid/liquid extraction system. In the preferred mode of the present process, the polydextrose containing fraction is rendered free of precipitate by filtration or other means. Residual organic solvent is removed from the polydextrose fraction by heating or similar techniques known to effect removal of organic solvents from aqueous liquids.

In the preferred modes of the present process, ethanol and acetone can be used as the polar solvent. When ethanol is used, the concentration of the aqueous polydextrose is preferably about 12.5% to about 83%, and the ratio of polydextrose to solvent is from about 5 to about 25 parts by weight of polydextrose to from about 45 to about 85 parts by weight of solvent. Most preferably when using ethanol, the concentration of polydextrose in water is from about 14% to about 50%, and the ratio of polydextrose to solvent is from about 5 to about 15 parts by weight of polydextrose to about 55 to about 75 parts by weight of solvent.

When acetone is used as a solvent, the concentration of the polydextrose is preferably from about 10% to about 62.5%, and the ratio of the polydextrose to solvent is from about 5 to about 25 parts by weight of polydextrose to from about 35 to about 75 parts by weight of solvent. Most preferably the concentration of polydextrose in water solution is from about 10% to about 37.5% and the ratio of polydextrose to solvent is from about 5 to about 15 parts by weight of polydextrose to from about 45 to about 65 parts by weight solvent.

After the aqueous solution of polydextrose and the solvent has been intimately contacted, such as by high-speed mixing, equilibration can be permitted for a time of from about 0.25 to about 48 hours at a temperature of from about $-15°$ C. to about 75° C., preferably such equilibration is conducted at about 0° C. to about 50° C., and most preferably at form about 20° C. to about 30° C. The time for equilibration is preferably about 10 to about 36 hours, and most preferably from about 12 to about 24 hours. Separation can be conducted such as by decanting a top layer of the substantially contaminant-containing fraction from the container. In a preferred embodiment separation can be accelerated by centrifugation.

Removal of the small molecular weight compounds, which are contaminants produced during manufacturing, makes the purified polydextrose difficult in certain circumstances to handle after purifying. It has been found when using the purified polydextrose for use in hard candy, a variety of small molecular compounds can be subsequently added to the purified form in order to facilitate its use in hard candy compositions. For example, small molecular weight compounds such as glycerin, polyhydric alcohols, monosaccharides, and disaccharides, can be added in an amount of from about 1 to about 40% by weight of the final hard candy composition, preferably not more than 20% and most preferably not more than 10% of the candy composition.

While the purified polydextrose solution prepared in accordance with the process can be used in any edible food product which is suitable for its inclusion, it has been found to be especially effective in the present invention to use it in confectionery products which require a bulking agent to replace sugar that has ben substituted by a high intensity sweetener. Thus, the polydextrose of the present invention can conveniently be used in a gum product, tablets, and candy such as hard candy, chocolates, and nougats as described above.

When used in these products, intensive sweeteners can be used which include acesulfame-K, aspartame, saccharin, or other high intensity sweeteners. The hard candy in the present invention can also contain acids such as citric acid, isocitric acid, maleic acid, fumaric acid, succinic acid, adipic acid, malic acid, and tartaric acid, with citric being the preferred acid for use in a hard candy composition along with the purified polydextrose. Other ingredients which can be used in the present composition include flavorings, colorings and salt which are known in the art for use in candy compositions.

As a result of the present invention food products containing 50% or more of polydextrose can be made to be organoleptically-acceptable by removal of the bitterness and musty off-flavor inherent in the polydextrose. This has been conveniently done in the process of tho present invention by removing small molecular weight compounds which are contaminants remaining from the manufacturing process, including endogenous levoglucosan (1,6-anhydroglucose), and small amounts of furfural derivatives which are likely to be responsible for the musty off-flavor.

Moreover the process of the present invention has been provided so that it removes the necessity of decoloration of the polydextrose ingredient by means of bleaching and the attendant processing steps which require production of undesirable salt constituents. Furthermore, the present process can be accomplished very simply without the need for a filtration step Furthermore, as a result of the present invention, a hard candy has been provided which is a truly very low-calorie hard candy product. Moreover, the hard candy product of the present invention can be processed in a very efficient manner without unnecessary additional steps of filtration and/or the use of pH control agents which may produce undesirable salts in the candy composition.

For a better understanding of the present invention, together with other and further objects, reference is made to the following description taken in conjunction with the accompanying drawings, and its scope will be pointed out in the appended claims.

BRIEF DESCRIPTION OF THE DRAWINGS

FIG. 1b is a ternary phase diagram which depicts the organoleptically successful runs of the experiments shown in FIG. 1a;

FIG. 2b is a ternary phase diagram which depicts the organoleptically successful runs of the experiments shown in FIG. 2a.

DETAILED DESCRIPTION OF THE INVENTION

In the first aspect, the present invention is a process for purification of polydextrose to a form which is highly usable in preparation of most edible foodstuffs for which such a bulking agent is appropriate. The procedure is enhanced by the fact that it is a simple operation which includes treatment of a polydextrose solution with polar organic solvents such as alcohols and ketones which is effective in removing the off-flavor from the commercially produced polydextrose.

A general procedure in accordance with the present invention includes dissolving polydextrose in deionized water (pH 2.5–3.0, not adjusted) and mixing the resulting solution with a polar organic solvent in a specific ratio. The mixture can be vigorously agitated until a homogenized emulsion is formed and then set aside to equilibrate. An appropriate time is needed for maximum recovery of the product and can range in its broadest aspect from 0.25 to 48 hours, and in a more preferred range from 10 to 36 hours, and most preferably from 12 to 24 hours. The temperature range at which the equilibration takes place can range from $-15°$ C., to 75° C., and is preferably from 0° C. to 50° C., but most preferably at about 20° C. to 30° C.

As a result of the equilibration, at least two fractions result, one of which is a contaminant-containing fraction, the other of which is a substantially purified polydextrose-containing fraction. This can appear as two layers in a container. The two layers can be accelerated after equilibration by standard methods used to destabilize emulsions, such as centrifugation, etc.

Once the fractions form, e.g., such as in layers, the upper layer, which is the contaminant-containing fraction, can be decanted off and saved for recovery of the organic solvent, since the upper layer contains mainly solvent, water plus low molecular weight polydextrose and off-flavor compounds.

The lower layer, containing predominantly purified polydextrose polymer and water is retained and is used as desired. The pH of the lower layer is usually about 3.0, and can be adjusted in accordance with different applications.

Thus, only minimum amounts of salts need be added to the product in order to fine tune it for the desired use. Bases used to adjust the pH can include sodium hydroxide, sodium citrate, or potassium hydroxide In term of optimizing the flavor of the polydextrose, potassium salts should be avoided since the potassium ion imparts an undesirable off flavor to the product. Residual solvent in a lower layer is easily removed by boiling, vacuum evaporation or other standard methods. Furthermore, the lower layer can also be dried if necessary to a powder by vacuum drying, spray drying and other standard techniques.

The final product is substantially free of off-flavor compounds which can be determined by sensory evaluation. The amount of residual off-flavor compounds in the product is affected by the initial ratio of polydextrose, water and polar organic solvents. The present invention includes the discovery of a range of ratios of polydextrose to water to solvent which is significant in providing the unexpectedly effective process of the present invention. These interesting results will be explained in combination with the examples set forth below.

EXAMPLES

Samples Were run using the general procedure described above in a ratio of polydextrose to water to solvent as set forth in Tables I and II below with respect to ethanol as a solvent in Table I and acetone as a solvent in Table II.

For example, Run 8 of the ethanol-polydextrose-water example was conducted as follows. The polydextrose Type A, water and pure ethanol were present at 30, 20 and 50 parts (W/W) in a beaker. Vigorous agitation was applied until an emulsion was formed. The emulsion-like mixture was equilibrated for 18 hours at room temperature and then centrifuged at 1500 xg for 10 minute after equilibration. The supernatant was decanted. The lower layer was then heated to remove residual ethanol. The pH of this final product was approximately 2.5 to 3.0, which was adjustable in order to accommodate different applications. The polydextrose yield was approximately 70% of the original solids. This final product as indicated in Table I had an acceptable sensory evaluation score of 2.

TABLE I

| Run Number | Ethanol Solvent Ratio (W/W/W) Polydextrose:Water:Solvent | Sensory Score |
|---|---|---|
| 1 | 10:10:80 | 2 |
| 2 | 20:10:70 | 2 |
| 3 | 10:20:70 | 3 |
| 4 | 30:10:60 | 2 |
| 5 | 20:20:60 | 2 |
| 6 | 10:30:60 | 3 |
| 7 | 40:10:50 | 1 |
| 8 | 30:20:50 | 2 |
| 9 | 20:30:50 | 2 |
| 11 | 50:10:40 | 1 |
| 12 | 40:20:40 | 1 |
| 13 | 30:30:40 | 2 |
| 16 | 60:10:30 | 1 |
| 17 | 50:10:40 | 1 |
| 22 | 70:10:20 | 1 |
| 23 | 60:20:20 | 1 |
| 29 | 80:10:10 | 1 |
| 30 | 70:10:20 | 1 |

A scale of 1-3 is used for sensory evaluation.
a score of 3 represents product with the best taste quality while a score of 1 represents the worse taste.

The product prepared in accordance with the sample sets herein were taste tested and given a comparative score of 1 through 3.

Example 8 of the acetone-polydextrose water combination was run using polydextrose Type A, water and acetone present at 30, 20 and 50 parts (W/W/W). The preparation procedure was the same as set forth in the Example above with respect to ethanol as a solvent. The recovery of the polydextrose at the end of Run 8 was approximately 90% of the original solids. This product has an acceptable sensory evaluation score of 2 as shown in Table II below.

TABLE II

| Run Number | Acetone Solvent Ratio (W/W/W) Polydextrose:Water:Solvent | Sensory Score |
|---|---|---|
| 1 | | 2 |
| 2 | | 2 |
| 3 | | 2 |
| 4 | | 2 |
| 5 | | 2 |
| 6 | 10:30:60 | 3 |
| 7 | 40:10:50 | 2 |
| 8 | 30:20:50 | 2 |
| 9 | 20:30:50 | 2 |
| 10 | 10:40:50 | 3 |
| 11 | | 1 |
| 12 | | 1 |
| 13 | | 2 |
| 16 | | 1 |
| 17 | | 1 |
| 18 | | 1 |
| 22 | 70:10:20 | 1 |
| 23 | 60:20:20 | 1 |
| 24 | 50:30:20 | 1 |

Figure 1A:
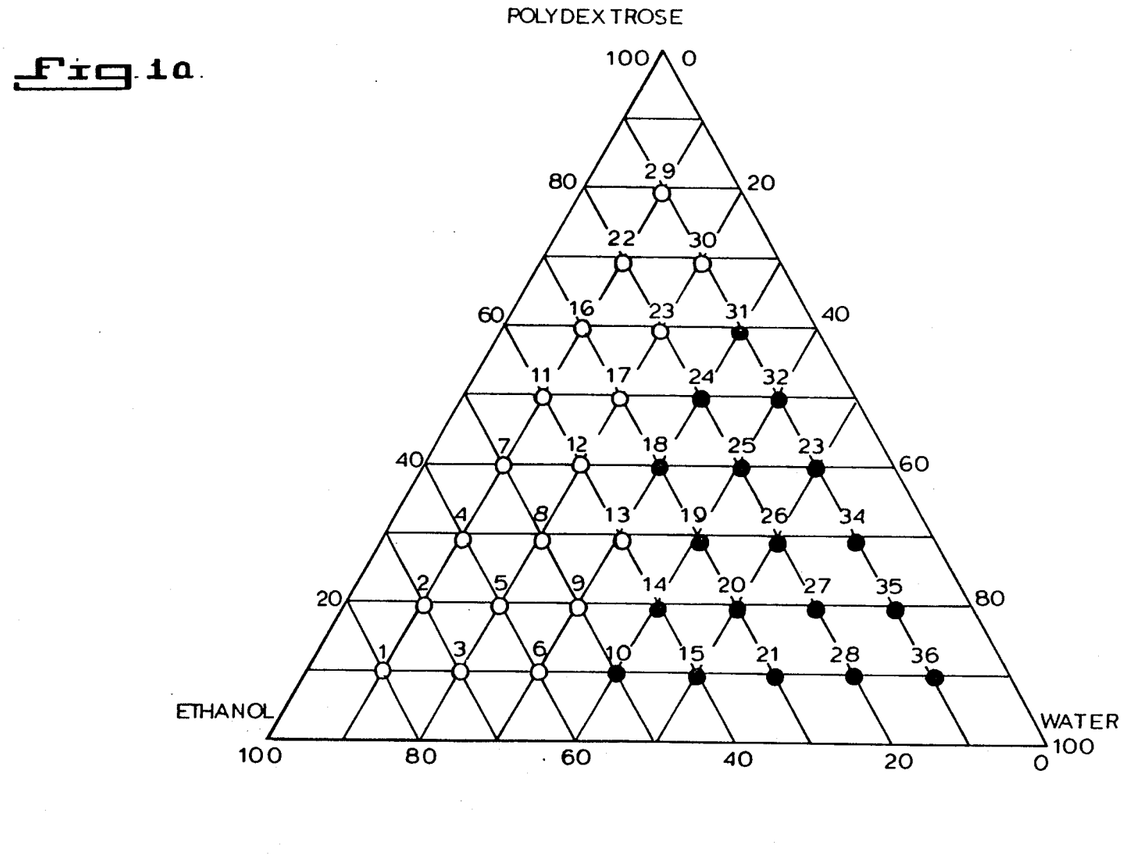
FIG. 1a is a ternary phase diagram which shows successful phase separation for experimental runs in accordance with the present invention using ethanol as a solvent.
Figure 2A:
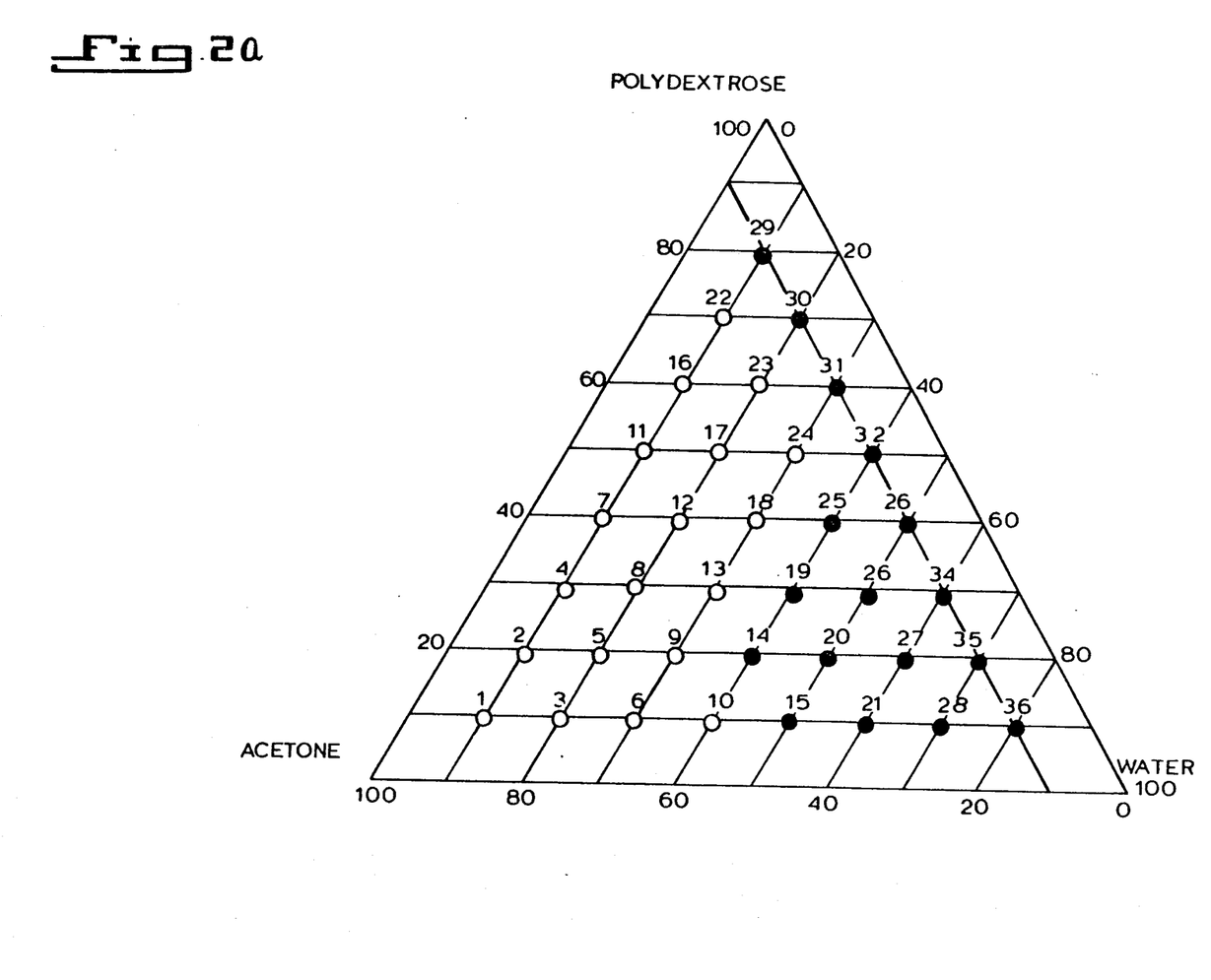
FIG. 2a is a ternary phase diagram which shows successful phase separation for experimental runs in accordance with the present invention using acetone as a solvent.

Referring to the ternary phase diagrams the results indicate the optimum ratios of polydextrose, water and ethanol or acetone needed for purification of the polydextrose to produce an organoleptically-acceptable product. In FIGS. 1a and 2a, the area designated with solid circles indicates ratios where polydextrose and solvent do not separate. The points designated by open circles show good separation of a polydextrose enriched phase from the solvent enriched phase.

Figure 1B:
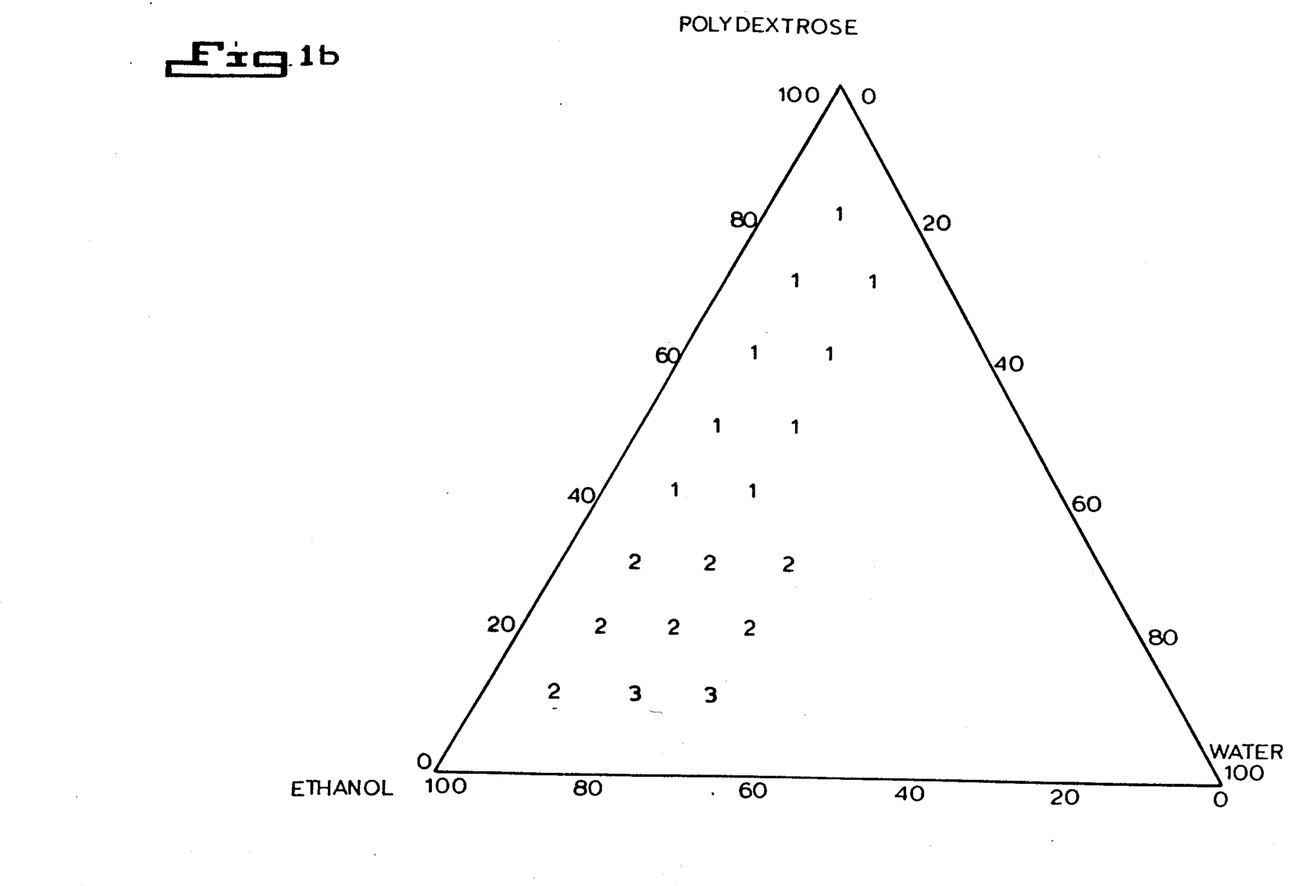
Figure 2B:
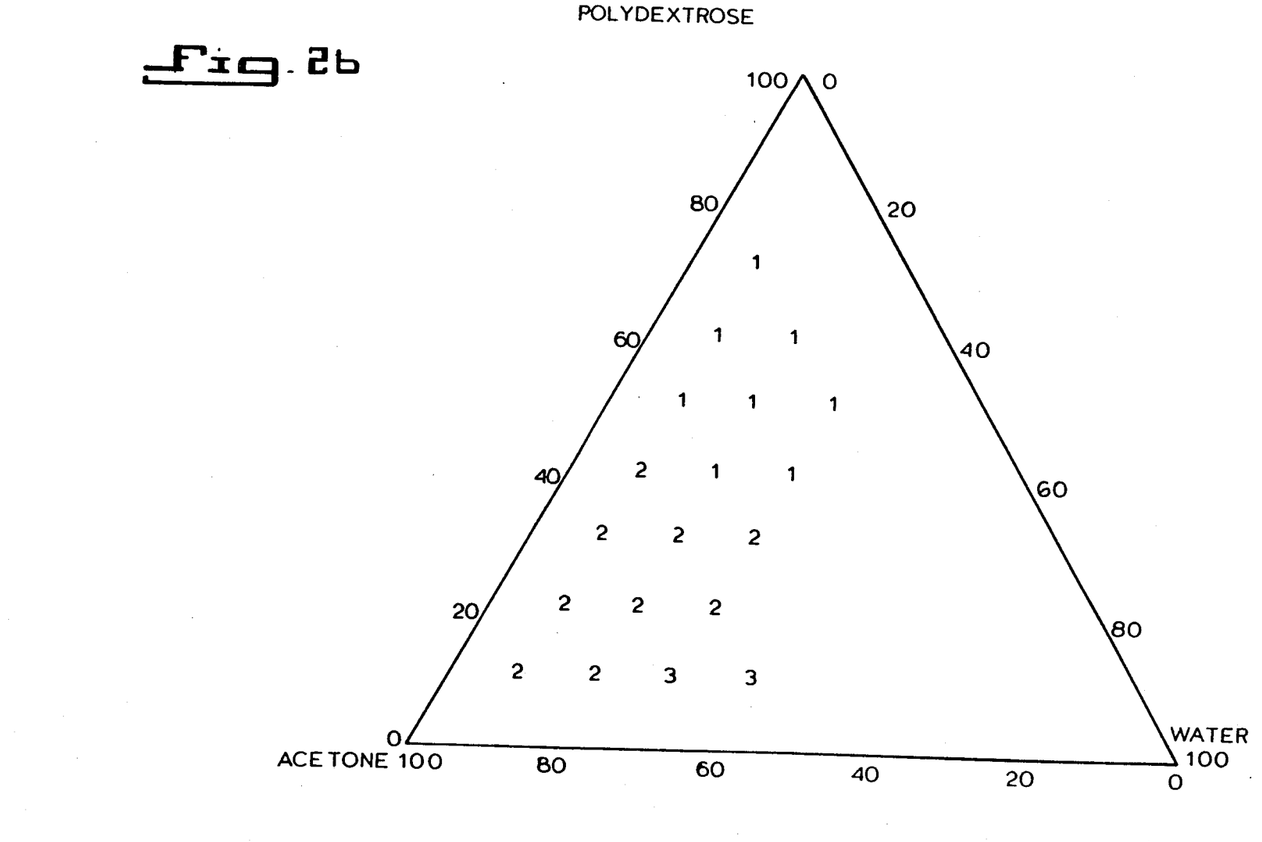

In FIGS. 1b and 2b, the areas in which the highest rating of 3 appears, show the most preferred range or ratios, whereas the areas wherein the next highest rating 2 appears show the preferred range of the ratios. Under these extraction conditions, the resulting polydextrose product has little, if any, off-taste.

It is noted that Type N polydextrose, e.g., in solution, can also be purified by the procedure of the present invention when the water content is taken into consideration.

HARD CANDY EXAMPLE

Hard candy samples were prepared using the purified polydextrose in accordance with the present invention. Specifically it was found that it was easier to cook and to handle the purified polydextrose in the presence of a variety of small molecular weight compounds which can be added after purification, such compounds behaving as plasticizers in the polymeric matrix.

Specifically, intensive sweeteners can also be used which include those from the following non-limiting list:

Water-soluble artificial sweeteners such as the soluble saccharin salts, i.e., sodium, or calcium saccharin, sucralose, cyclamate salts, acesulfame-K and the like, and the free acid form of saccharin. Furthermore dipeptide based sweeteners such as L-aspartyl-L-phenylalanine methyl ester and materials described in U.S. Pat. No. 3,492,131 and the like. In general, the amount of sweetener will vary with the desired amount of sweetness desired for particular confection whether it be chewing gum, candy or tablet. The artificial sweeteners described in the above categories are used in amounts of from about 0.005% to about 5.0% and most preferably from about 0.05% to about 2.5% by weight of the final composition.

Suitable flavorings include both natural and artificial flavors, and mints such as peppermint, spearmint, menthol, artificial vanilla, vanilla, artificial chocolate, chocolate, cinnamon, various fruit flavors, both individual and mixed, and the like are contemplated. The flavorings are generally utilized in amounts that will Vary depending upon the individual flavor, and may, for example, range in amounts from 0.5% to about 3% by weight of the final composition.

The colorants used for in the present invention include pigments which may be incorporated in amounts up to about 6% by weight of the composition. A preferred pigment, titanium dioxide, may be incorporated in amounts up to 1% by weight. Also, the colorants may include other dyes suitable for food, drug and cosmetic applications, and are known as F.D. & C. dyes and the like. The materials acceptable for the foregoing spectrum of use are preferably water-soluble Illustrative examples include the indigo dye, known as FD&C blue No. 2, which is the disodium salt of 5,5-indigotindisulfonic acid. Similarly, the dye known as FD&C green No. 1, comprises a triphenyl methane dye and is the monosodium salt of 4-(N-ethyl-sulfobenzylamino) (dyephenyl-methylene)-(1-(N-ethyl-N-p-sulfoniumbenzyl)-2,5 cyclohexadienimine). A full recitation of all FD&C and D&C colorants and their corresponding chemical structures may be found in the Kirk-Othmer Encyclopedia of Chemical Technology, 3rd Edition, Volume 6, at Pages 561-595, which text is accordingly incorporated herein by reference.

When preparing a hard candy composition, acids may also be included such as citric acid, isocitric acid, maleic acid, fumaric acid, succinic acid, adipic acid, malic acid and tartaric acid, with citric being preferred.

An actual composition was prepared in accordance with the following formula. The purified polydextrose was boiled with glycerine to 130° C. The resulting product was allowed to cool to 80° C. Citric acid, sweetener, flavoring and coloring were added to the cooled product. The resulting product was then placed on a cooling table and worked to evenly distribute the ingredients The product was then formed into pieces of hard candy.

| FORMULA CHERRY FLAVORED HARD CANDY | |
|---|---|
| Ingredient | W/W % |
| Purified polydextrose | 94.0 |
| Glycerine | 5.0 |
| Citric acid | 0.5 |
| Aspartame | 0.2 |
| Flavoring | 0.2 |
| Color (Red #40) | 0.1 |

Upon testing the hard candy produced in accordance with the above procedure and formula, it was found that a very sweet good quality product was produced which was organoleptically pleasing and was aesthetically acceptable.

Thus, while there had been described what are presently believed to be the preferred embodiments of the invention, those skilled in the art will realize that other and further changes can be made to the invention without departing from the true scope thereof, and it is intended to claim all such changes and modifications as fall within the scope of the invention.

What is claimed is:

1. A liquid/liquid extraction process for purifying polydextrose having contaminants remaining from manufacturing thereby providing an organoleptically acceptable polydextrose ingredient comprising:
   vigorously agitating said mixture to form a homogenized emulsion of said polydextrose in said polar organic solvent,
   allowing said homogenized emulsion to equilibrate to form a substantially contaminant-containing liquid fraction and a substantially polydextrose-containing liquid fraction,
   separating said liquid fractions for use of said polydextrose-containing liquid fraction, and
   recovering said purified polydextrose ingredient from said polydextrose-containing liquid fraction.

2. The liquid/liquid extraction process of claim 1 wherein said solvent is selected from the group consisting of ethanol, acetone and mixtures thereof.

3. The liquid/liquid extraction process of claim 1 wherein said concentration of polydextrose in water is from about 14% to about 50% and said ratio of polydextrose to solvent is from about 5 to about 15 parts by weight of polydextrose to from about 55 to about 75 parts by weight of solvent wherein the solvent is ethanol.

4. The liquid/liquid extraction process of claim 1 wherein said concentration of polydextrose in water is from about 10% to about 37.5% and said ratio of polydextrose to solvent is from about 5 to about 15 parts by weight of polydextrose to from about 45 to about 65 parts by weight of solvent wherein the solvent is acetone.

5. The liquid/liquid extraction process of claim 1 wherein said equilibration is permitted for a time of from about 0.25 to about 48 hours.

6. The liquid/liquid extraction process of claim 1 wherein said separation comprises decanting a top layer of said substantially contaminant-containing fraction.

7. The liquid/liquid extraction process of claim 1 wherein said separation is accelerated by centrifugation.

8. The liquid/liquid extraction process of claim 1 which further comprises subsequently adding to said purified polydextrose small molecular weight compounds selected from the group consisting of glycerin, polyhydric alcohols, monosaccharides, disaccharides and mixtures thereof in preparation for use in hard candy.

9. The liquid/liquid extraction process of claim 8 wherein said polydextrose is present in an amount of 55–99% and said small molecular weight compounds are added in an amount of from about 1 to about 40% of a resulting hard candy formula.

10. The liquid/liquid extraction process of claim 9 wherein said small molecular weight compounds are added in an amount of up to about 20%.

11. The liquid/liquid extraction process of claim 10 wherein said compounds are added up to about 10%.

12. The liquid/liquid extraction process of claim 8 wherein said small molecular weight compound is glycerin.

13. The liquid/liquid extraction process of claim 12 wherein said glycerin is added in an amount of about 3 to 8% by weight of a resulting hard candy formula.

14. The liquid/liquid extraction process of claim 1 wherein said purified polydextrose ingredient is recovered from said polydextrose-containing liquid fraction by means of boiling.

15. The liquid/liquid extraction process of claim 1 wherein said purified polydextrose ingredient is recovered from said polydextrose-containing liquid fraction by means of vacuum evaporation.

16. A purified polydextrose product prepared by a liquid/liquid extraction process comprising the steps of:
 (a) mixing an aqueous solution of commercially available contaminant-containing food grade polydextrose having a concentration of about 10% to about 50% with a polar organic solvent in a ratio of polydextrose to solvent of from about 5 to about 15 parts by weight of polydextrose to about 45 to about 75 parts by weight of solvent;
 (b) vigorously agitating the thus formed mixture to form a homogenized emulsion of said polydextrose in said polar solvent;
 (c) allowing said homogenized emulsion to equilibrate to form a substantially contaminant-containing liquid fraction and a substantially polydextrose-containing liquid fraction;
 (d) separating said liquid fractions for use of said polydextrose-containing liquid fractions; and
 (e) recovering said purified polydextrose ingredient from said polydextrose-containing liquid fraction.

17. The product of claim 16 wherein said solvent is selected from the group consisting of ethanol, acetone and mixtures thereof.

18. The product of claim 16 wherein said concentration of polydextrose in water is from about 14% to about 50% and said ratio of polydextrose to solvent is from about 5 to about 15 parts by weight of polydextrose to from about 55 to about 75 parts by weight of solvent.

19. The product of claim 16 wherein said concentration of polydextrose in water is from about 10% to about 37.5% and said ratio of polydextrose to solvent is from about 5 to about 15 parts by weight of polydextrose to from about 45 to about 65 parts by weight of solvent.

20. The product of claim 16 wherein said purified polydextrose ingredient is recovered from said polydextrose-containing liquid fraction by means of boiling.

21. The product of claim 16 wherein said purified polydextrose ingredient is recovered from said polydextrose-containing liquid fraction by means of vacuum evaporation.

22. An edible composition free of residual off-flavor compounds comprising purified, substantially contaminant-free polydextrose, said composition formed by the process comprising:
 (a) mixing an aqueous solution of commercially available contaminant-containing food grade polydextrose having a concentration of about 10% to about 50% with a polar organic solvent in a ratio of polydextrose to solvent of from about 5 to about 15 parts by weight of polydextrose to about 45 to about 75 parts by weight of solvent;
 (b) vigorously agitating the thus formed mixture to form a homogenized emulsion of said polydextrose in said polar solvent;
 (c) allowing said homogenized emulsion to equilibrate to form a substantially contaminant-containing liquid fraction and a substantially polydextrose-containing liquid fraction;
 (d) separating said liquid fractions for use of said polydextrose-containing liquid fraction; and
 (e) recovering said purified polydextrose ingredient from said polydextrose-containing liquid fraction.

23. The composition of claim 22 which is a confectionery product.

24. The composition of claim 23 wherein said confectionery product is selected from one of gum, candy and tablet.

25. The composition of claim 24 wherein said confectionery product is hard candy.

26. The composition of claim 25 which further comprises small molecular weight compounds selected from the group consisting of glycerin, polyhydric alcohols, monosaccharides, disaccharides and mixtures thereof added to said polydextrose subsequent to said purification to facilitate cooking and handling of said purified polydextrose.

27. The composition of claim 26 wherein said polydextrose is present in an amount of about 55–99% and said small molecular weight compounds are added in an amount of from about 1 to about 40% by weight of said hard candy composition.

28. The composition of claim 23 wherein said small molecular weight compounds are added in an amount up to about 20%.

29. The composition of claim 28 wherein said small molecular weight compounds are added in an amount up to about 10%.

30. The composition of claim 26 wherein said small molecular weight compound is glycerin added in an amount of about 3% to 8% of the overall candy composition.

31. The composition of claim 22 wherein said purified polydextrose is recovered from said polydextrose-containing liquid fraction by means of boiling.

32. The composition of claim 22 wherein said purified polydextrose ingredient is recovered from said polydextrose-containing liquid fraction by means of vacuum evaporation.

* * * * *

UNITED STATES PATENT AND TRADEMARK OFFICE
CERTIFICATE OF CORRECTION

PATENT NO. : 4,948,596

DATED : August 14, 1990

INVENTOR(S) : Frank Bunick et al.

Page 1 of 2

It is certified that error appears in the above-identified patent and that said Letters Patent is hereby corrected as shown below:

Column 6, lines 34-54, TABLE II should be corrected to read as shown on the attached page.

Signed and Sealed this

Eighth Day of September, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,948,596

DATED : August 14, 1990

INVENTOR(S) : Frank Bunick et al.

It is certified that error appears in the above-identified patent and that said Letters Patent is hereby corrected as shown below:

TABLE II

Acetone Solvent

| Run Number | Ratio(W/W/W) Polydextrose:Water:Solvent | Sensory Score |
|---|---|---|
| 1 | 10:10:80 | 2 |
| 2 | 20:70:70 | 2 |
| 3 | 10:20:70 | 2 |
| 4 | 30:10:60 | 2 |
| 5 | 20:20:60 | 2 |
| 6 | 10:30:60 | 3 |
| 7 | 40:10:50 | 2 |
| 8 | 30:20:50 | 2 |
| 9 | 20:30:50 | 2 |
| 10 | 10:40:50 | 3 |
| 11 | 50:10:40 | 1 |
| 12 | 40:20:40 | 1 |
| 13 | 30:30:40 | 2 |
| 16 | 60:10:30 | 1 |
| 17 | 50:20:30 | 1 |
| 18 | 40:30:30 | 1 |
| 22 | 70:10:20 | 1 |
| 23 | 60:20:20 | 1 |
| 24 | 50:30:20 | 1 |